Dec. 15, 1936.  J. R. BROWNELL ET AL  2,064,193
APPARATUS FOR CONTROLLING STOKERS
Filed March 13, 1931  7 Sheets-Sheet 1

INVENTORS
Clarence B. Little
John R. Brownell
BY
ATTORNEYS

Dec. 15, 1936.  J. R. BROWNELL ET AL  2,064,193
APPARATUS FOR CONTROLLING STOKERS
Filed March 13, 1931  7 Sheets-Sheet 2

INVENTORS
Clarence B. Little
John R. Brownell
BY
ATTORNEYS

Dec. 15, 1936.          J. R. BROWNELL ET AL          2,064,193
                 APPARATUS FOR CONTROLLING STOKERS
                  Filed March 13, 1931        7 Sheets-Sheet 4
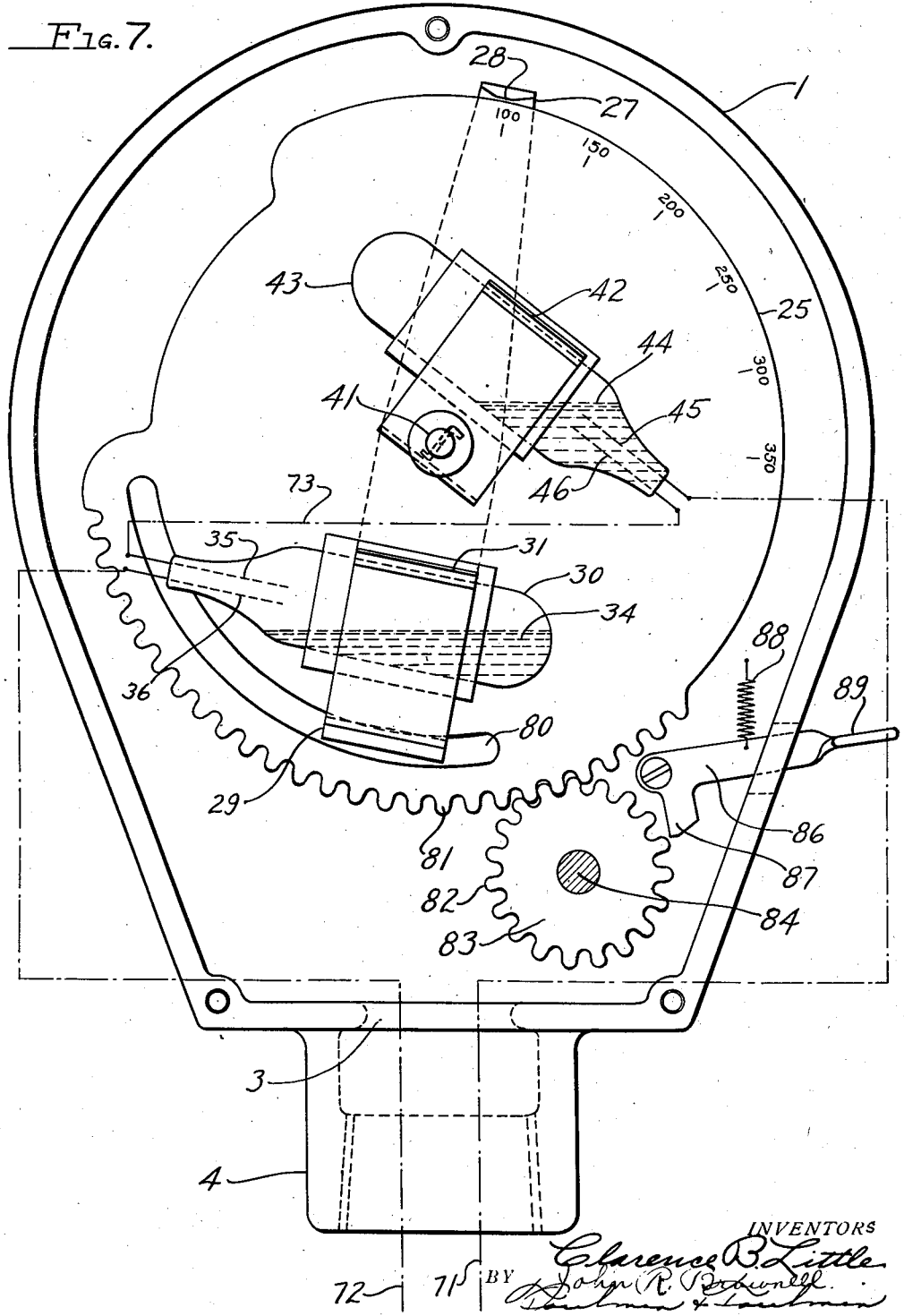

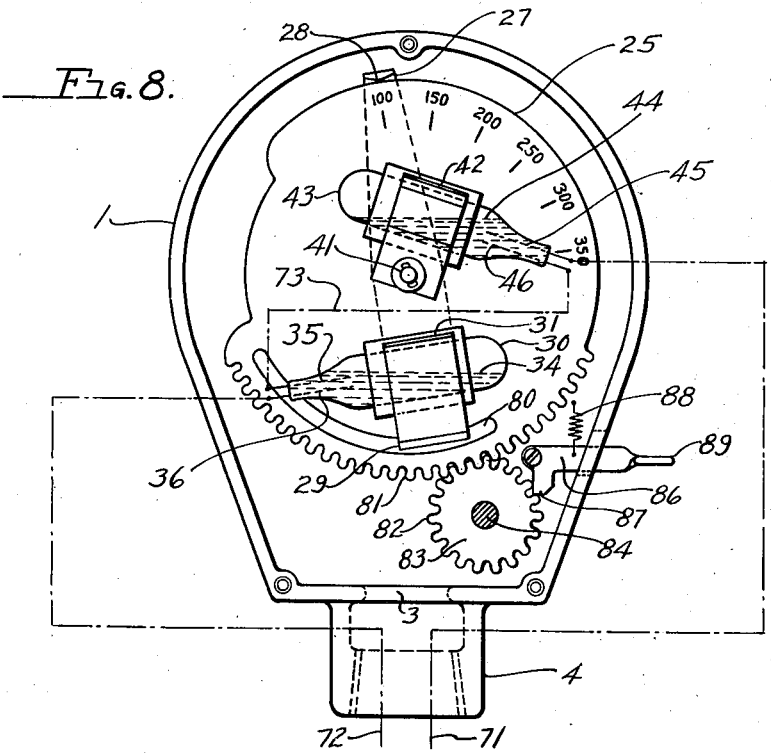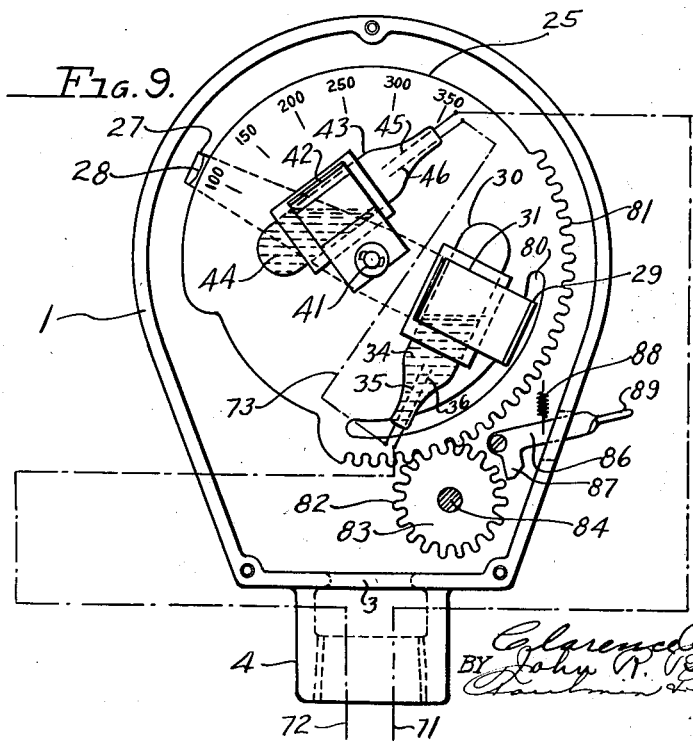

Dec. 15, 1936.  J. R. BROWNELL ET AL  2,064,193
APPARATUS FOR CONTROLLING STOKERS
Filed March 13, 1931  7 Sheets-Sheet 6

INVENTORS
Clarence B. Little
BY John R. Brownell
ATTORNEYS.

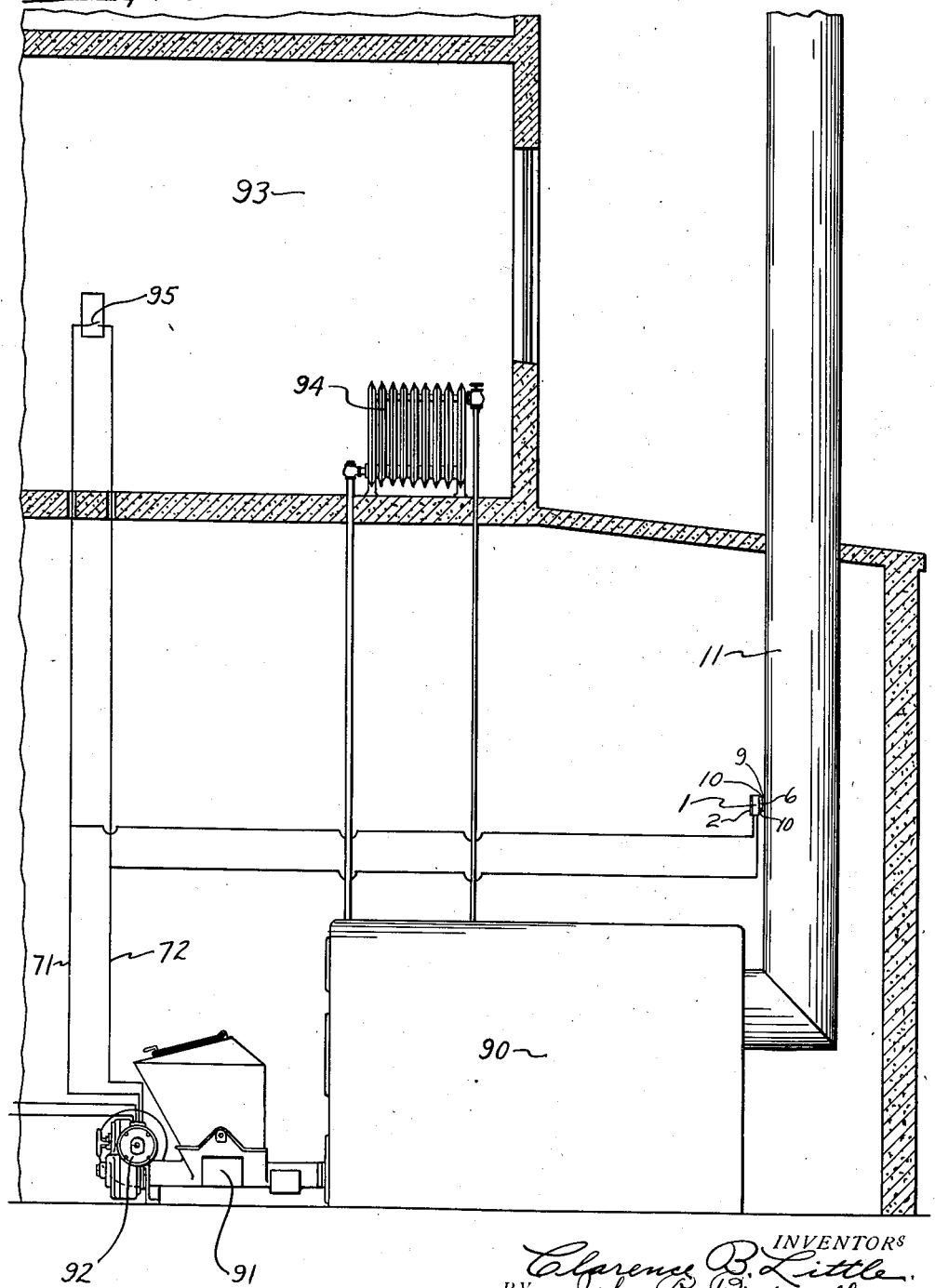

Patented Dec. 15, 1936

2,064,193

UNITED STATES PATENT OFFICE 2,064,193

APPARATUS FOR CONTROLLING STOKERS

John R. Brownell and Clarence B. Little, Dayton, Ohio, assignors, by mesne assignments, to Minneapolis-Honeywell Regulator Company, a corporation of Delaware Application March 13, 1931, Serial No. 522,447

35 Claims. (Cl. 236—9)

Our invention relates to an apparatus for controlling stokers and the like in connection with the regulation of the temperature in an enclosure to which heat is supplied by the stoker in connection with the boiler that the stoker is attached to.

Heretofore, the stoker started and stopped depending upon the closing of the electric circuit connected to the motor of the stoker and this circuit was closed or opened depending upon the temperature of the enclosure which was being heated by the boiler to which the stoker was attached.

In circumstances where the room or enclosure remained warm for a considerable period, it was found that the stoker, not operating to feed green coal, the fire would go out.

This thermostatic control in the electric circuit connected to the motor and to the thermostat in the enclosure has this object:

Thermostatic devices are located in the stack in series, one of which moves within the maximum ranges of temperature within which it is desired that the motor circuit shall be closed irrespective of the temperature conditions in the enclosure being heated, so that, if the enclosure thermostat does not close to start up the stoker before the fire goes out, the cooling of the stack will cause these thermostatic devices to close the circuit and start up the stoker for a sufficient period within a certain temperature range as indicated in the stack to replenish the fire before it goes out.

Referring to the drawings:

Figure 7 is a front elevation with the cover removed of a modified form of control shown in position with the fire out and the parts are being moved up into starting position;

Figure 8 is a similar view showing the parts in starting position after resetting by hand;

Figure 9 is a similar view showing the parts in "off" position with the temperature up and with the contacts just starting to revolve backwardly as the temperature descends;

Figure 11 is a diagrammatic view of the boiler, stoker, stoker motor, stack, enclosure and connection between the motor, room thermostat and stack thermostatic control.

Figure 1:
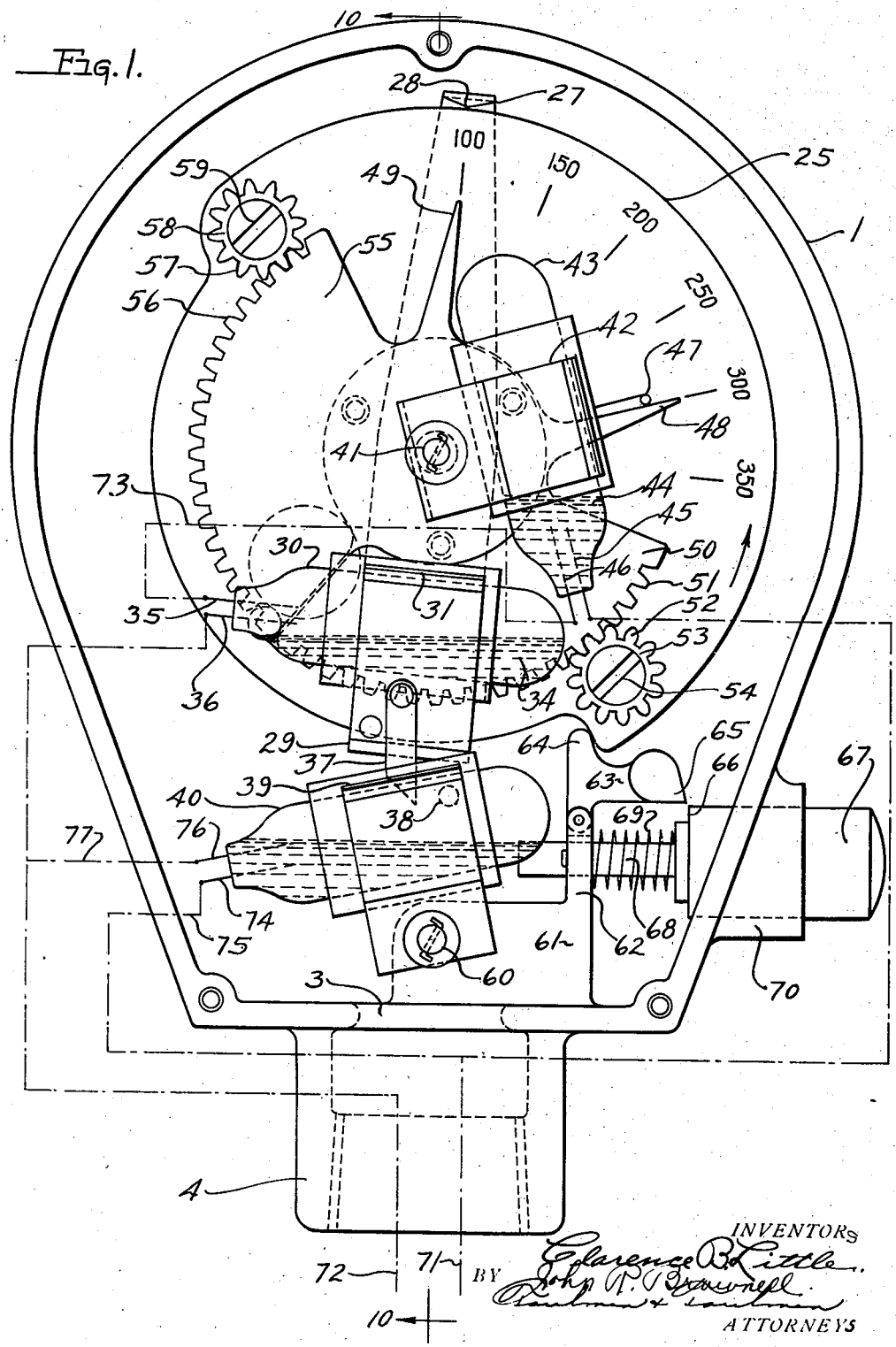
Figure 1 is an elevation of the face of the stack thermostat with the front cover removed showing the parts where the fire in the stoker has completely died out, it has just been rebuilt, the starting button has been pushed and the starting contact has been pushed into contact-making position.

Referring to the drawings in detail, 1 indicates a casing having a cover plate 2. The casing 1 is provided with an aperture 3 and a sleeve 4 to which is connected a conduit 5 for receiving the electric cable. The casing is also provided with an annular rearward extension 6 having a passageway 7. This extension is embraced by a collar 8 which is fastened by the ears 9 and screws 10 to the wall 11 of the stack. Interposed between this collar 8 and the sleeve 6 is a guard sleeve 12 which extends into the stack in the path of the fluid gases. The sleeve 12, the collar 8 and the sleeve 6 are held in engagement with one another by the set screw 13.

The sleeve 12 is so arranged that its upper half is cut away as at 14 leaving the thermostatic element 15 exposed but below the thermostatic element in the path of the incoming gases, this protecting sleeve is integral as at 16 so that soot and other foreign material will not be deposited on the thermostatic element 15 impeding its movement.

The thermostatic element is connected by the screw 17 to one end of the shaft 18. Its other end is connected by the screw 19 to a fixed abutment sleeve 20 that is held rigidly in position within the collar 6 by the set screw 21. 22 indicates a sealing disk around the inner end of the shaft at 23. The inner end of the shaft is mounted within the hub 24 of the rotating disk 25 that acts as a carrier for the running contact elements and other associated parts. A set screw 26 retains the hub 24 on the inner end of the shaft 23.

Freely mounted upon this hub 24 is a rotating lever 27, the upper end of which is turned over at 28 to form a pointer with respect to the scale on the face of the supporting plate 25 behind which the lever 27 is located. The lower end of this lever extends forwardly beneath the plate 25 as at 29 to form a support for one of the running contacts, the function of which is hereinafter described.

The mercury contact member 30 is mounted within the spring fingers 31 upon the arm 29 and is retained in such position by the set screws 32 and washer 33 which retain the spring finger 31 upon the arm 29. This contact member is of the usual form consisting of a sealed glass tube having a quantity of mercury 34 therein and terminal wires 35 and 36 sealed in one end thereof.

It is also provided with a depending finger 37 fastened on one of the spring arms 31 and adapted to engage with a pin 38 on one of the spring arms 39 which support the starting contact member 40. By adjusting the position of the lever 27 the point at which the starting contact will be rotated by the rotation of the contact member 30 upon movement of the thermostatic element 15 will be determined. For instance, if the starting contact is to be thrown into inoperative position when the temperature is above 100 degrees, as indicated in Figure 1, then the rotation of the thermostatic element at and above that temperature will result in placing the starting contact in an inoperative position from which it cannot be moved until the finger button hereinafter described is operated.

The hub 24 carries the shaft 41 upon which is pivoted the spring arms 42 that carry one of the running contact members 43 provided with the usual quantity of mercury 44 and the terminal wires 45 and 46.

This spring arm construction is provided with a finger 47 that extends above the contact member and serves as a limiting stop between the two limiting pointers 48 and 49 which, in this instance, are set at 100 degrees and 300 degrees respectively, thus providing the temperature range through which these thermostatic controls operate in the stack and also provide the range of movement of the thermostatic element 43.

This finger 48 is mounted on the segment plate 50 which is provided with teeth 51 engaging with the teeth 52 of a pinion 53 which is actuated by the slotted stud 54. This stud and pinion are mounted upon the plate 25. Thus the adjustment of the position of the pointer 48 is effected.

The pointer 49 is mounted upon the segment plate 55 provided with teeth 56 engaging with the teeth 57 on the pinion 58 actuated by the stud 59 mounted on the plate 25. This plate controls the minimum temperature setting. Both of these plates are rotatable upon the shaft 41.

Thus, the contact-making member 43 rocks freely back and forth between the fingers 48 and 49 which determine the maximum temperature movement of this contact-making member and the range within which it operates while the lever 27 positioning the contact member 30 serves to determine the temperature at which the contact member 30 will shift the starting contact and above which the starting contact member 40 will be thrown into inoperative position, to which it can only be restored manually which necessitates the operator going to the stoker and restarting the fire.

The starting contact member 40 is pivotally mounted through its spring arms 39 upon the shaft 60 that is in turn supported upon the bracket 61 formed as a part of the casing 1. This bracket 61 is provided on an upstanding finger portion 62 with a latch member 63 which has a nose 64 and a latching abutment or head 65. This head 65 is adapted to engage the shoulder 66 of the plunger 67 which is guided in its reciprocatory movement by the pin 68 slidably supported in the upstanding finger 62 of the bracket 61. A spring 69 is interposed between the shoulder 66 and the upstanding finger 62. The plunger 67 is guided by the sleeve 70, such sleeve 70 being mounted on the casing 1.

It will be noted that the contact members 43 and 30 are in series with the electrical circuit and contact member 40 is in parallel. 71 and 72 indicate the respective sides of the circuit connected to the motor of the stoker. The wire 71 is connected to the terminal 45 of the contact member 43. The wire 73 connects the terminals 46 and 35 of the contact members 43 and 30 respectively. The other terminal 36 of the contact member 30 is connected to the wire 72. The starting contact member which is connected in parallel across the line has its terminal 74 connected by the wire 75 to the wire 71, and its terminal 76 is connected by the wire 77 to the line 72.

Referring to the modifications shown in Figures 6, 7, 8 and 9, the plate 25 in this form is provided with a slot 80 through which the arm 29 moves and below this slot there are a plurality of teeth 81 in engagement with the teeth 82 of the pinion 83 which pinion is actuated by the shaft 84 and the hand wheel 85. A detent 86 having a nose 87 engaging the teeth 82 is actuated against the spring 88 by the finger piece 89.

In operation, when the device is moved by the reduction of the temperature to 100 degrees or below, it is enabled to do so without obstruction because the spring-controlled pawl or detent nose 87 is out of engagement with teeth 82. It will be noted that when the device has reached the position due to a temperature of 100 degrees or less (shown in Fig. 7) that contact member 30 is "open" and will remain "open" until reset manually.

Figure 8 shows the parts in starting position after having been reset by turning the knob 85, and manipulating the detent 86. As soon as fire is started and a temperature above 100 degrees is obtained in the smoke pipe, the device will assume its normal movement, due to the rising temperature, which releases the detent 86 and the spring 88 holds it out of engagement with teeth 82 so the device may function in the usual manner until such time as it becomes necessary to start a new fire.

Fig. 9 shows the position of device after the temperature has reached its upper limit and contact member 43 is "open" and the stack is cooling off.

In operation, when the device is moved by the reduction of the temperature to 100 degrees or below, it is enabled to do so without obstruction because the spring-pressed pawl or detent nose 87 is held away from the teeth 82. For starting purposes the apparatus is set as shown in Figure 8. The pinion 83 and the detent 86 act as a means for rendering the thermostatic control within the stack ranges of 100 and 300 degrees inoperative.

In Figure 7 it will be noted that the parts are in position where the fire is out and hand starting is required by turning the knob 85 and manipulating the pawl or detent 86. Figure 8 shows the parts in starting position after having been reset by hand, and Figure 9 shows the parts in "off" position with the temperature up and with the stack starting to cool off.

*Operation*

Figure 10:
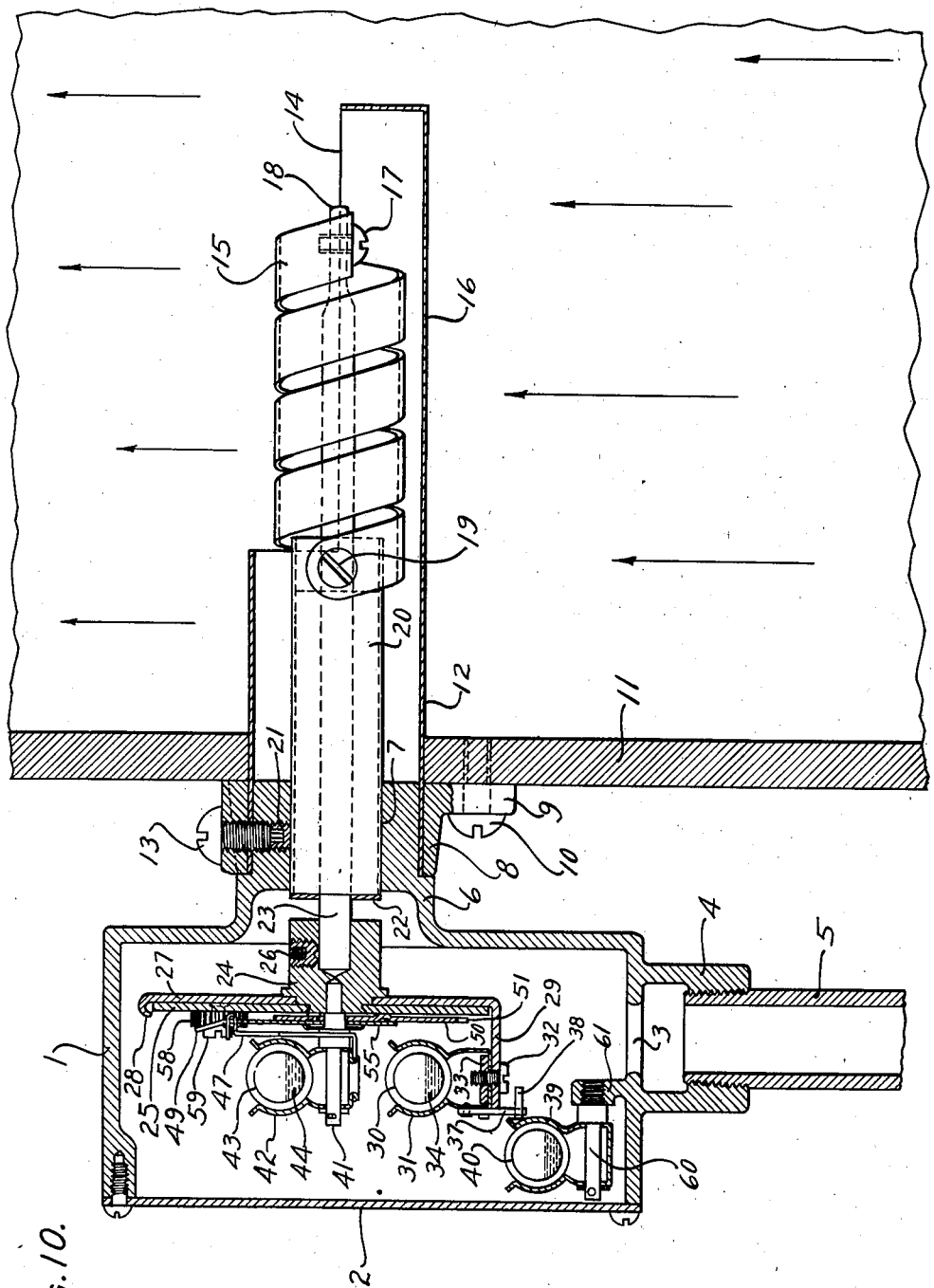
Figure 10 is a section on the line 10—10 of Figure 1.

Returning to the construction shown in Figures 1 to 5 and in Figure 10 and partially with respect to Figures 7 to 9, except as heretofore described, it will be understood that, in this apparatus, a thermostat in the room being heated by the boiler to which the stoker is attached will control through the electric circuit indicated the starting and stopping of the motor according to the temperature of that room, but where the temperature of the room falls below a certain temperature and the stack temperature falls below 300 degrees or any other arbitrary setting that may be desired, then if coal is not fed by the stoker for a considerable period the fire may go out. To take care of this condition, we have provided the two contact elements 43 and 30, which operate between some predetermined setting of temperature, such, for instance, as from 300 degrees down to 100 degrees in the stack. When the temperature gets down to 100 degrees, both of the contact-making members 43 and 35 are rotated by the thermostatic element 15 and the shaft 18 to the position shown in Figure 2, where the contacts are made by the position of the mercury and the respective contact members 43 and 30 and the motor is caused to start up on the stoker, which motor is connected to the lines 71 and 72 and coal is fed to the fire to prevent it from dying and this feeding continues until the temperature in the stack gets up to 300 degrees, at which point the parts will assume the position shown in Figure 3 with one or more of the contacts broken.

In the event that the fire has gone out and the contact-making elements get over to the position where the temperature is 100 degrees, the decreasing temperature, due to the fire being out and getting below 100 degrees, will cause further rotation of the disk 25 and lever 27 with the associated parts. The starting contact maker 40 having been thrown over backwardly by the finger 37 to remove the mercury from the contacts 74 and 76 into the position shown in Figures 2, 3 and 4 will remain in this position until shifted manually.

This occurs because the finger 37 has engaged the pin 38 and tilted the contact-making member for the starting contact 40 into its inoperative position in which it remains because of the fact that the push button 67 cannot push it into position due to the fact that the latch 65 is in the path of the push button 67. It will be noted that the heel 64 of this latch normally rests within a cut away portion of the plate 25 and against the shoulder of the cut away portion. When the plate 25 moves so as to engage through this shoulder the heel 64 it lifts the latch 65. As the contact maker 40 is in parallel with the circuit, the motor circuit may be made by a proper positioning of the maker 40 whereby the motor can start up and feed coal. For this purpose it is necessary for the operator to go to the boiler, start the fire, push the button 67 to restore the circuit by putting the contact-making member 40 into engaging position so that the mercury covers the terminals 74 and 76.

Figure 2:
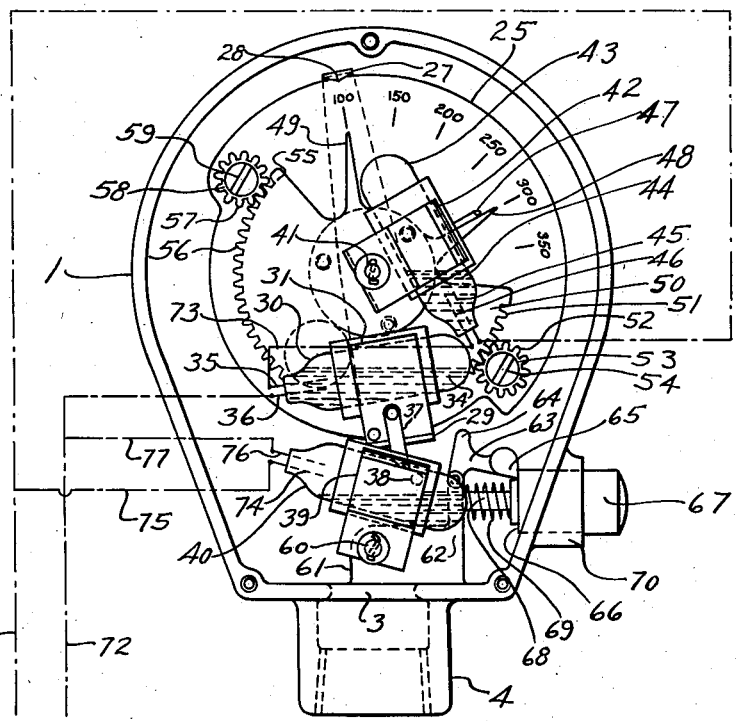
Figure 2 shows a similar view with the parts in running condition and the temperature is beginning to rise in the stack so that the starting contact has been thrown into inoperative position by the running contacts.
Figure 3:
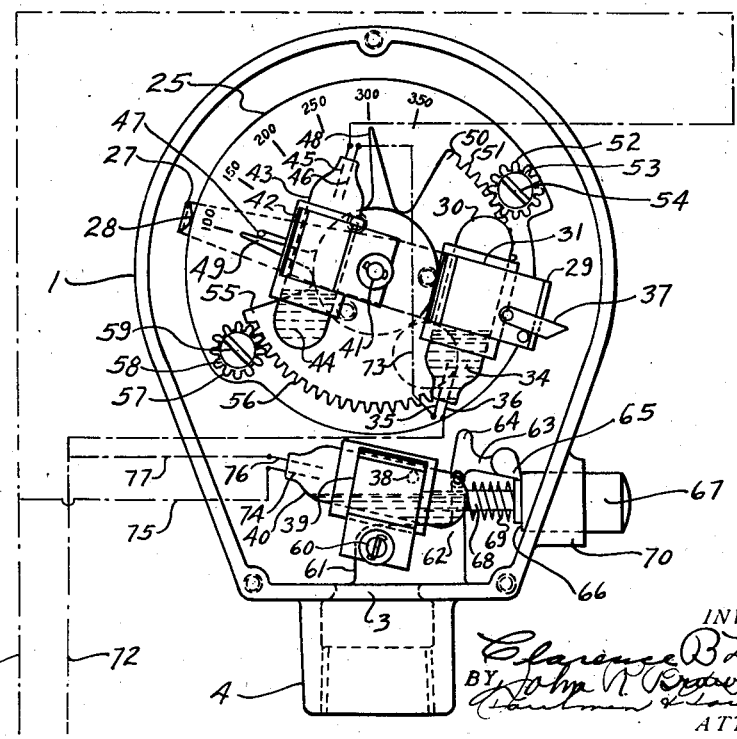
Figure 3 is a similar view showing the running contacts in position where the heat has gotten up to 300 degrees in the stack and due to the excessive heat the running contacts are off and the parts are now returning towards the position shown in Figrue 2.
Figure 4:
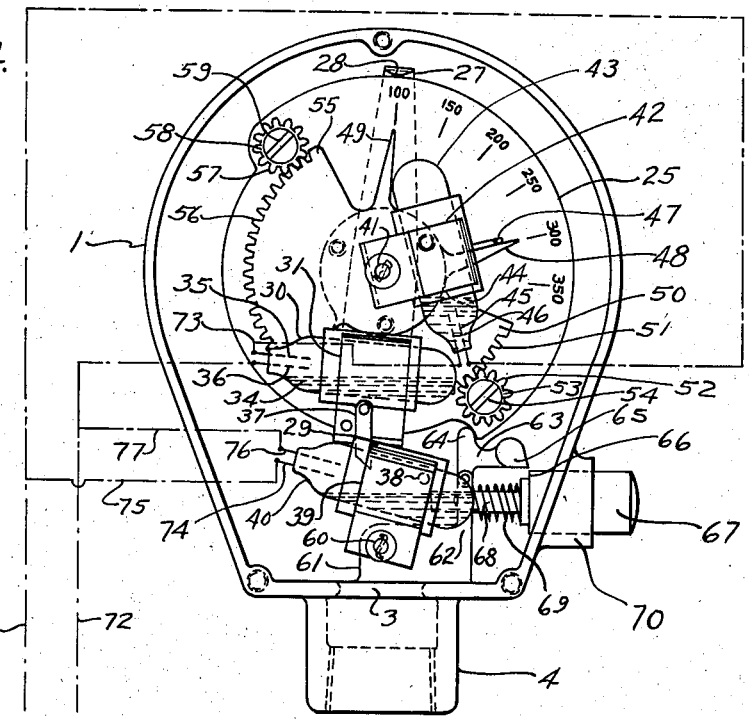
Figure 4 is a similar view showing the parts in "off" position with the fire out and the starting contact ready to be put into starting position as in Figure 1 by the pressure of the starting buttons.
Figure 5:
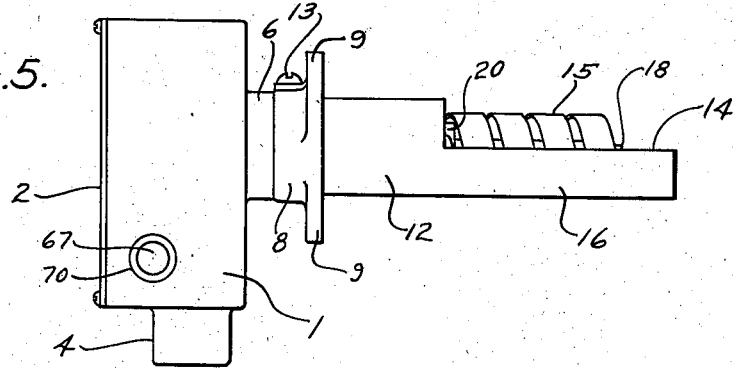
Figure 5 is a side elevation of the thermostatic casing and the thermostatic element.
Figure 6:
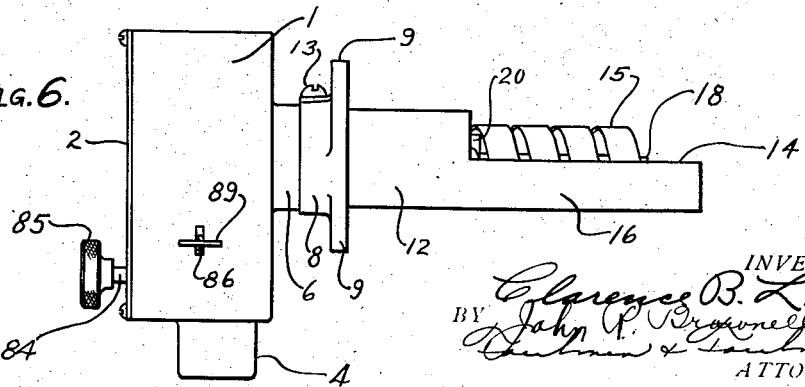
Figure 6 is a similar view of a modified form of this thermostatic control.

Before pushing the button, the parts are as shown in Figure 4 where the latch has been lifted and the fire is out: upon pushing the button the parts are as in Figure 1 ready to start; and when the stoker gets into operation the parts will assume the positions shown in Figure 2, and, when the heat becomes considerable as up to 300 degrees and the circuit is cut off, the parts will assume the position shown in Figure 3, the contact-making member 43 having rotated from the position in Figure 2 over to the position in Figure 3.

In other words, Figure 2 is in the 300-degree position and the contact member 43 remains with its spring finger 47 against the pointer 48 while the disk 25 is traveling counterclockwise until the contact member 43 gets over dead center whereupon it suddenly rocks in a counterclockwise direction until its spring finger 47 is stopped by the finger 49. At this point the temperature is approaching 300 degrees. This gives a sudden make and break of the contact member 43. The lower contact member mounted on the lever 27 is set with respect to the plate 25 to determine the minimum temperature in the stack at which this thermostatic control will start up if there is still fire in the stoker. When the temperature in the stack starts to cool the reverse movement will take place.

In the forms shown in Figures 6, 7, 8 and 9 the starting contact member 40 is omitted, but the pinion 83 and pawl 86 are substituted for the purpose of preventing the contact members and their associated parts 43 and 30 operating if the temperature falls below some predetermined minimum, such temperature being that temperature or any temperature below it which would indicate that the fire was out.

It will be understood that when we refer to specific temperatures, we are only doing this as a matter of illustration and that any desired setting may be secured. That is a matter of choice depending upon the conditions of operation of the apparatus.

For the purpose of illustration we have indicated in Figure 11 the boiler 90 having a stack 11 with a stoker 91 and a motor 92. 93 indicates an enclosure supplied with heat from the boiler to the radiator 94. The electrical circuit in which the motor is connected is provided with a room thermostat to open and close the circuit designated 95.

It will be understood that we desire to comprehend within our invention such modifications as may be necessary to adapt it to varying conditions and uses.

Having thus fully described our invention, what we claim as new and desire to secure by Letters Patent is:

1. In a thermostatic control, the combination of an electric circuit, a room thermostat, a motor controlled by said circuit for feeding coal to a furnace, a stack thermostat in the furnace stack connected in parallel to said circuit, and a plurality of means to render said parallel circuit inoperative, one of said means acting when the temperature in said stack falls below a predetermined point and another acting when said temperature rises above a predetermined point.

2. In a thermostatic control, the combination of an electric circuit, a room thermostat, a motor controlled by said circuit for feeding coal to a furnace, a stack thermostat in the furnace stack connected in parallel to said circuit, and means to render said parallel circuit inoperative when the temperature in the stack falls below a predetermined value and when it rises above a predetermined value.

3. In a thermostatic control, the combination of an electric circuit, a room thermostat, a motor controlled by said circuit for feeding coal to a furnace, a stack thermostat in the furnace stack connected in parallel to said circuit, and means to render said parallel circuit inoperative when the temperature in the stack falls below a predetermined value.

4. In combination, in a temperature control apparatus, of an electric motor, means associated therewith for feeding fuel to a furnace, a thermostat affected by outgoing combustion gases from the furnace, said thermostat being so arranged that it may operate to close the motor circuit and operate said motor within a predetermined range of temperature in the fluid gases, and means to render said circuit inoperative when said fluid gases are reduced in temperature below a predetermined point or raised in temperature above a predetermined point.

5. In combination, in a temperature control apparatus, of an electric motor, means associated therewith for feeding fuel to a furnace, a thermostat affected by outgoing combustion gases from the furnace, said thermostat being so arranged that it may operate to close the motor circuit and operate said motor within a predetermined range of temperature in the fluid gases, and means to render said circuit inoperative when said fluid gases are reduced in temperature below a predetermined point.

6. In combination, in a temperature control apparatus, of an electric motor, means associated therewith for feeding fuel to a furnace, a thermostat affected by outgoing combustion gases from the furnace, said thermostat being so arranged that it may operate to close the motor circuit and operate said motor within a predetermined range of temperature in the fluid gases, means to render said circuit inoperative when said fluid gases are reduced in temperature below a predetermined point, and means to manually reclose said electric circuit.

7. In a thermostatic control apparatus, a thermostatic element, an electric circuit having a starting switch therein and regulating switches in parallel with the starting switch, means controlled by said electric circuit for varying the temperature applicable to said thermostat, and means in said thermostat to open the starting switch and to operate the regulating switches for starting and stopping the means for varying the temperature to the thermostat within predetermined ranges.

8. In a thermostatic control apparatus, a thermostatic element, an electric circuit having a starting switch therein and regulating switches in parallel with the starting switch, means controlled by said electric circuit for varying the temperature applicable to said thermostat, and means in said thermostat to open the starting switch and to operate the regulating switches for starting and stopping the means for varying the temperature to the thermostat within predetermined ranges, and means to close the starting switch independent of the thermostat.

9. In a thermostatic control apparatus, a thermostatic element, an electric circuit, means controlled by said electric circuit for varying the temperature applicable to said thermostat, means for starting the means for varying the temperature, means in said thermostat for cutting out the starting means and thereafter causing the starting and stopping of the means for varying the temperature to the thermostat within predetermined ranges, and means for resetting said starting means to again render it operative.

10. In combination in a temperature control for a furnace having a stack carrying fluid gases, a thermostatic element in said stack, an electric circuit, a motor for controlling the furnace temperature and controlled by the circuit, a contact member operable by said thermostatic element for opening and closing said circuit within a predetermined range of temperatures in said stack, and a second contact member adapted to make and break said circuit operable by said thermostatic element to break the circuit when the temperature in said stack reaches a predetermined temperature.

11. In combination in a temperature control for a furnace having a stack carrying fluid gases, a thermostatic element in said stack, an electric circuit, a motor controlling the furnace temperature and controlled by the circuit, contact members operable by said thermostatic element for opening and closing said circuit, another contact member in parallel with the contact members, and manual means for closing said other contact member.

12. In combination in a temperature control for a furnace having a stack carrying fluid gases, a thermostatic element in said stack, an electric circuit, a motor controlling the furnace temperature and controlled by the circuit, contact members operable by said thermostatic element for opening and closing said circuit, another contact member in parallel with the contact members movable to a circuit breaking position by said thermostatic element, and means to manually reset said other contact member in a circuit making position.

13. In combination with an electric circuit including a motor for driving a stoker, a stack for conducting fluid gases from a furnace fed by the stoker, a thermostatic element in said stack, and a plurality of contact-making members connected into said circuit operable by said thermostatic element, one of said contact-making members arranged to open and close said circuit according to the temperature of the fluid gases within predetermined ranges, and another of said contacting members arranged to render said first mentioned contact-making member inoperative when the temperature in the stack reaches a predetermined point.

14. In combination with an electric circuit including a motor for driving a stoker, a stack for conducting fluid gases from a furnace fed by the stoker, a thermostatic element in said stack, a plurality of contact-making members connected into said circuit operable by said thermostatic element, one of said contact-making members arranged to open and close said circuit according to the temperature of the fluid gases within predetermined ranges, and another of said contacting members arranged to render said first mentioned contact-making member inoperative when the temperature in the stack reaches a predetermined point, and means for manually restoring said last mentioned contact-making member to render said first contacting member operative.

15. In a heating system, the combination of means for supplying fuel for heating purposes, a control device for said means operable to prevent permanent cessation of operation of the system under substantially low heat requirement conditions, and a second control device arranged to discontinue the operation of said first mentioned control device when the fire is substantially extinguished.

16. A control system of the class described comprising, in combination, an electrically operated stoker, a heat responsive switch for operating the stoker when the temperature of the fire produced by the stoker falls below a predetermined degree, and a second switch for preventing operation of the stoker by the heat responsive switch if the fire becomes extinguished.

17. A control for a heating system embodying a furnace and means including a driving motor for supplying fuel to said furnace comprising, in combination, a motor circuit including a control device connected to said furnace and responsive to variations of fire conditions therein when the heating system is operating under low heat requirement conditions to prevent permanent cessation of operation of the system, and a second motor circuit connected in series with said first-mentioned circuit, said second circuit including a minimum temperature responsive device adapted to open said circuit when the fire is substantially extinguished.

18. In a heating system, the combination of means for supplying fuel for heating purposes, a control device for said means operable to prevent permanent cessation of operation of the system under substantially low heat requirement conditions, a second control device arranged to discontinue the operation of said first mentioned control device when the fire is substantially extinguished, and a thermostatic device responsive to a furnace condition for operating both of said control devices.

19. In a system of the class described, the combination of means for supplying fuel to a furnace, means responsive to an abnormal furnace condition for rendering said fuel supply means inoperative, and manual reset means for said last mentioned means whereby said fuel supply means may be rendered operative.

20. In a system of the class described, the combination of means for supplying fuel to a furnace, means responsive to an abnormal furnace condition for rendering said fuel supply means inoperative, and releasable manual reset means for said last mentioned means whereby said fuel supply means is rendered operative, said reset means being released when the furnace condition becomes normal.

21. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, and manual means for moving said switching mechanism to a circuit making position whereby said fuel supply means is rendered operative.

22. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, and releasable means for moving said switching mechanism to a circuit making position, said releasable means being released when said switching mechanism is maintained in a circuit making position by said condition responsive means.

23. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, a second switching mechanism in parallel with said first switching mechanism whereby said fuel supply means is rendered operative when said second switching mechanism is moved to a circuit making position.

24. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, a second switching mechanism in parallel with said first switching mechanism whereby said fuel supply means is rendered operative when said second switching mechanism is moved to a circuit making position, manual means for moving said second switching mechanism to a circuit making position, and means responsive to furnace conditions for moving said second switching mechanism to a circuit-breaking position.

25. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, a second switching mechanism in parallel with said first switching mechanism whereby said fuel supply means is rendered operative when said second switching mechanism is moved to a circuit making position, manual means for moving said second switching mechanism to a circuit making position and means operated by said condition responsive means for moving said second switching mechanism to a circuit-breaking position.

26. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, a second switching mechanism in parallel with said first switching mechanism whereby said fuel supply means is rendered operative when said second switching mechanism is moved to a circuit making position, manual means for moving said second switching mechanism to a circuit making position, means responsive to furnace conditions for moving said second switching mechanism to a circuit-breaking position, and means for preventing movement of said second switching mechanism to a circuit making position when said furnace condition is normal.

27. In a system of the class described, the combination of means for supplying fuel to a furnace, switching mechanism in control of said fuel supplying means, condition responsive means responsive to an abnormally low furnace condition to move said switching mechanism to a circuit-breaking position whereby said fuel supplying means is rendered inoperative, a second switching mechanism in parallel with said first switching mechanism whereby said fuel supply means is rendered operative when said second switching mechanism is moved to a circuit making position, manual means for moving said second switching mechanism to a circuit making position, means operated by said condition responsive means for moving said second switching mechanism to a circuit-breaking position, and means operated by said condition responsive means for preventing movement of said second switching mechanism to a circuit making position when said furnace condition is normal.

28. In a heating system, the combination of means for supplying fuel for heating purposes, a control device for said means operable to prevent permanent cessation of operation of the system under substantially low heat requirement conditions, a second control device arranged to discontinue the operation of said first mentioned control device when the fire is substantially extinguished, and means to render said second control device inoperative to permit operation of said first mentioned device.

29. In a heating system, the combination of means for supplying fuel for heating purposes, a control device for said means operable to prevent permanent cessation of operation of the system under substantially low heat requirement conditions, a second control device arranged to discontinue the operation of said first mentioned control device when the fire is substantially extinguished, and means to render both of said control devices inoperative and cause operation of the fuel supplying means independently thereof.

30. In a heating system, the combination of means for supplying fuel for heating purposes, a control device for said means operable to prevent permanent cessation of operation of the system under substantially low heat requirement conditions, a second control device arranged to discontinue the operation of said first mentioned control device when the fire is substantially extinguished, means to render both of said control devices inoperative and cause operation of the fuel supplying means independently thereof and means for rendering said control devices operative when the fire is restored.

31. In a heating system, the combination of means for supplying fuel for heating purposes, a control device for said means operable to prevent permanent cessation of operation of the system under substantially low heat requirement conditions, a second control device arranged to discontinue the operation of said first mentioned control device when the fire is substantially extinguished, means to render said second control device inoperative to permit operation of said first mentioned device, and means for rendering said second control device operative when the fire is restored.

32. In a heating system embodying a furnace and means for supplying fuel to the furnace, the combination of a room thermostat, a furnace thermostat, and connections between the thermostats and the fuel supplying means to operate the fuel supplying means upon a demand for heat, to operate said fuel supplying means when the furnace temperature reaches a predetermined low value, and to prevent the last mentioned operation when the fire has become substantially extinguished.

33. In a heating system embodying a furnace and means for supplying fuel to the furnace, the combination of means for placing the fuel supplying means in operation upon a demand for heat, means for placing the fuel supplying means in operation when the furnace temperature reaches a predetermined low value, and means for preventing operation of said fuel supplying means by said last mentioned means when the furnace temperature reaches a predetermined lower value.

34. A control system of the class described, comprising, in combination, a fuel control device, a thermostat responsive to the heat produced by the burning of the fuel controlled by said fuel control device, control mechanism operated by the thermostat, connections between the control mechanism and fuel control device for preventing operation of the latter when the temperature to which said thermostat responds falls to a value indicating that the fire has become extinguished, means for manually latching said mechanism in a position to operate the fuel control device, and means for automatically unlatching said mechanism when the temperature at the thermostat rises to a value indicating that combustion has been restored whereby the control system is thereafter subject to automatic control.

35. In a heating system, the combination of electrically operated means for supplying fuel for heating purposes, a first switching mechanism for controlling said means to prevent permanent cessation of operation of said means under substantially low heat requirement conditions, and a second switching mechanism for preventing operation of said means when the fire is substantially extinguished.

JOHN R. BROWNELL.
CLARENCE B. LITTLE.